Jan. 13, 1948.   H. DIAMOND ET AL   2,434,263
DETERMINING UPPER AIR WIND CONDITIONS BY RADIO DIRECTION FINDING
Filed Dec. 22, 1938
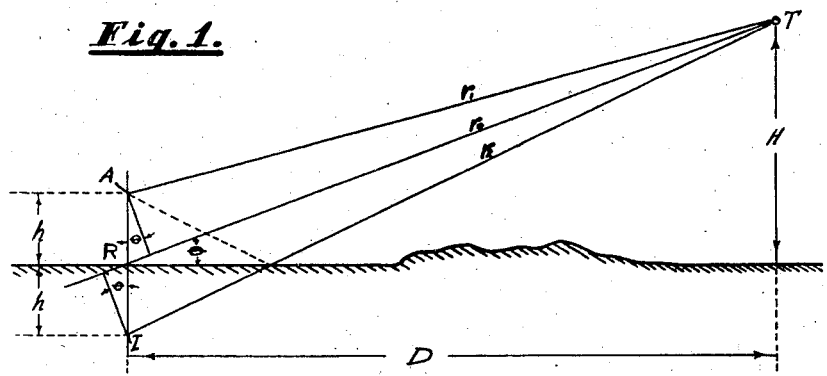
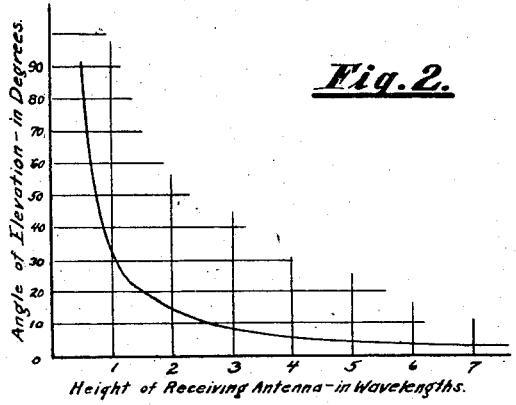
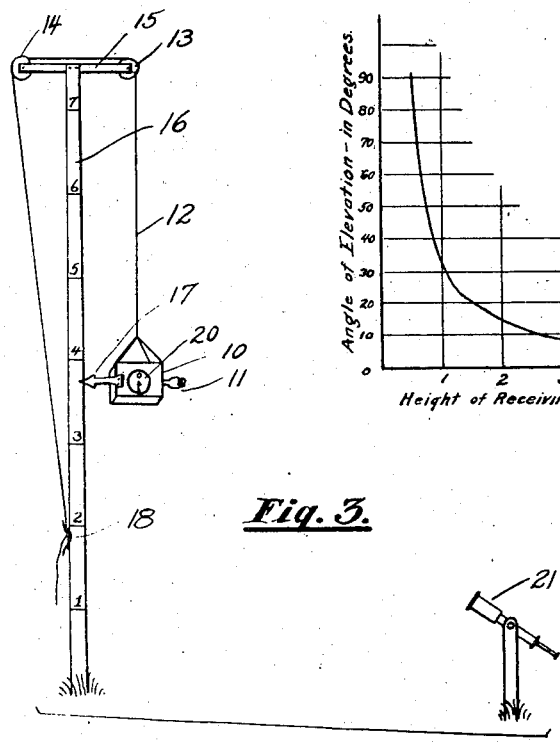
Harry Diamond,
Francis W. Dunmore,
Wilbur S. Hinman, Jr.
INVENTORS,
BY
ATTORNEY Patented Jan. 13, 1948

2,434,263

UNITED STATES PATENT OFFICE 2,434,263

DETERMINING UPPER AIR WIND CONDITIONS BY RADIO DIRECTION FINDING

Harry Diamond and Francis W. Dunmore, Washington, D. C., and Wilbur S. Hinman, Jr., Falls Church, Va., assignors to the United States of America, as represented by the Secretary of Commerce Application December 22, 1938, Serial No. 247,244

6 Claims. (Cl. 343—113)

(Granted under the act of March 3, 1883, as amended April 30, 1928; 370 O. G. 757)

The invention described herein may be manufactured and used by or for the Government for governmental purposes without the payment to us of any royalty thereon.

The present invention relates to determination of vertical angles of incidence of radio waves, and is particularly, but not exclusively, useful in determining upper air wind conditions in radiometeorography.

In radiometeorography, a radio transmitter carried by an unmanned balloon is sent aloft and transmits to a ground station data as to various meteorological facts. In the form constituting the subject-matter of the copending application of Diamond and Hinman, Serial Number 206,086, filed May 4, 1938, now Patent No. 2,283,919, issued May 26, 1942, and described, as in the present invention, in the Bulletin of the American Meteorological Society, March 1937, pages 73–100 (see also Bureau of Standards Research Paper R. P. 1082, Journal of Research N. B. S., vol. 20, March 1938, pages 369–391), the radiometeorograph transmits a continuous carrier wave, particularly suitable for direction finding in accordance with the present invention, enabling tracking of the path of the balloon, and thereby giving data on the upper air wind conditions.

To evaluate upper-air wind velocities, it is necessary to measure continuously the distance and azimuthal direction of the balloon from the ground station. Before discussing the methods which we proposed to apply for measuring these factors it is informative to analyze briefly the inherent requirements of the problem. We will consider the two phases of the problem separately; viz.: (a) measuring the azimuthal direction of the balloon, and (b) determining its distance from the ground station. The assumption will be made that it is desired to secure measurements corresponding to each 1000-foot level. The accuracy required will then depend upon the magnitude of wind speed to be measured, upon the wind direction, and upon the rate of ascent of the balloon. Thus, considering a balloon ascent of 1000 feet per minute, the quantity which it is desired to measure consists of the vector increment in distance caused by the wind carrying the balloon for one minute. Obviously, the lower the wind speed the greater will be the required accuracy. For a given wind velocity the accuracy of measurement required will depend upon whether the balloon is traveling along the line from the ground station or at an angle to it.

Assume first of all that it is possible to secure absolute measurements of the distance. The next matter to determine is what accuracy is required for the azimuthal bearings to secure an accuracy of 10% for a wind velocity of 30, 20 or 10 mi./hr. To take the easiest possible case, in spite of any impossible physical phenomena involved, let the distance be 5 miles and let the balloon travel at right angles to the line from the ground station. Since the determination required taking two bearings, each bearing must be accurate respectively to ±0.3, ±0.2 and ±0.1° for the three cases considered. This simple problem will serve to give a rough idea of the surprising order of accuracy required. From the physics of the problem, the upper limit is more representative of actual conditions. On the basis of smoothing out readings by plotting and other averaging means, it appears that an accuracy of from ±0.5 to ±1.0° is acceptable for determining azimuthal direction per se. Experiments which we have conducted, using a six-element directional receiving antenna array at a frequency of 200 megacycles per second, indicate that an accuracy of this order can be attained using maximum methods.

Next, consider the problem of measuring distance. This is an even more difficult problem. The usual procedure adopted is to set up two or more ground direction-finding stations separated by from 5 to 20 miles and, from the azimuthal bearings taken simultaneously at each of the stations, to determine the distance by triangulation. An exhaustive study has been made by Corriez and Perlat (La méthode radiogoniometrique de l'Office National Météorologique pour la mesure de la direction et de la vitesse du vent par temps couvert, by MM. Corriez and Perlat. La Météorologie, August 1936, No. 125, New Series, p. 368), on the errors obtained in distance measurements by this method using two ground stations each having an accuracy of bearing determination of ±0.5°. Briefly summarizing their conclusions, optimum conditions obtain when the balloon is equidistant from the two stations (i. e., along a direction perpendicular to their base line). For these conditions maximum accuracy is obtained when the distance of the balloon from the center of the base line is equal to half the base line. The maximum possible error in distance measurement by triangulation is then about 3%. As the distance of the balloon increases above or decreases below this optimum value, the maximum possible error rapidly increases. Thus, for a value slightly greater than the base line, errors of the order of 5% are possible; for twice the base line, errors up to 7.5%; and for four times the base line, errors up to 12.5%. Corresponding errors may obtain for distances less than half the base line. While the errors quoted are maximum possible values, nevertheless they may occur, particularly since the operating conditions do not permit of taking check readings. Increasing the base line to reduce errors toward the end of an ascension operates to increase the errors obtained at the beginning of a flight.

The difficulties in obtaining accurate distance measurements by the triangulation method coupled with the undesirability of requiring more than one ground direction-finding station, has led us to develop the present new mode of measuring the angle of elevation of the balloon.

In the accompanying drawing Fig. 1 is a diagram illustrating the principle of the present invention;

Fig. 2 is a graph illustrating relationship discovered and employed in the invention; and Fig. 3 is a diagrammatic representation of a receiving means according to the invention.

Since the radiometeorograph balloon, as above mentioned, carries a transmitter (at T, Fig. 1) which gives accurate indications of its altitude, determination of the angle of elevation would permit evaluation of its horizontal distance from the receiving point. Neglecting curvature of the earth and atmospheric refraction, the relation is simply $$D = H \cot g. \theta \qquad (1)$$

where D is the horizontal distance in any units, H the height in the same units, and $\theta$ the angle of elevation (see Fig. 1). While a somewhat more complicated expression must be used for actual evaluation of D in order to include the effects of earth curvature and atmospheric refraction, nevertheless Equation 1 will serve for analysis of the accuracy of distance measurements with this method. The accuracy of distance determination is a direct function of the accuracy of measuring the height and the elevation angle. Assume that it became possible to measure this angle to $\pm 0.5°$. For an elevation angle of 10°, the maximum possible error in distance measurement would be only 5% while for an elevation angle of 60° it would be only 2%. These errors are in addition to those produced by errors in measurement of the balloon height.

The literature does not disclose any successful attempts at measuring elevation angles by direction-finder methods. The difficulty may be seen from an examination of Fig. 1, in which T represents the balloon transmitter, R the receiving point, and $h$ the height of the receiving antenna A above ground.

The receiving antenna receives not only a direct ray along the path $r_1$ but also a ray reaching the ground surface along the path $r_2$ and being reflected to the antenna. Receiving systems having directivity in the vertical plane cannot differentiate between these two rays and hence measure a resultant direction, usually inclined very little above the horizontal. However, by following a different line of attack, we have obtained what appears to be proof that the elevation angle can be measured.

For the sake of simplicity of explanation of this method, it will be assumed that the coefficient of reflection from the earth's surface ($\rho$) is $-1$ regardless of the angle of incidence of the receiving wave. This is very nearly true at frequencies of the order of 100 megacycles per second or higher for horizontally-polarized waves. The reflected ray may hence be treated as reaching the negative image I of the receiving antenna, at distance $h$ below the surface. The total received electric field is then $$E = E_d + E_r$$

whence $$E = \frac{E_o}{r_o}\left[\cos\left(\omega_o t - \frac{2\pi}{\lambda}h \sin \theta\right) - \cos\left(\omega_o t + \frac{2\pi}{\lambda}h \sin \theta\right)\right]$$

and simplifying $$E = \frac{2E_o}{r_o} \sin \omega_o t \sin\left(\frac{2\pi}{\lambda}h \sin \theta\right) \qquad (2)$$

where $E_d$ (the direct ray) and $E_r$ (the reflected ray) are referred to the field $E_o$ which would exist at R in the absence of the ground; and $\omega_o$ equals $2\pi$ times the carrier frequency; $\lambda$ is the wave length; $t$, time; and the other factors are shown in Fig. 1. This equation assumes that $r_o$ is very large compared to $h$, which is true in all practical cases.

From Equation 2, it will be observed that zero field will occur whenever the antenna height is such that $$2\frac{h}{\lambda} \sin \theta = n$$

where $n$ is an integer, or $$E = 0 \text{ when } \theta = \sin^{-1} \frac{n\lambda}{2h} \qquad (3)$$

Thus the angle of elevation may be measured simply by varying the height of the receiving antenna until a null is obtained in the receiving set output. Equation 3 represents a family of graphs corresponding to different values of $n$ and hence indicates that a series of nulls will be obtained corresponding to a given elevation angle. It can be shown, however, that only the graph corresponding to $n=1$ need be used provided the value of the receiving antenna height corresponding to the lowest null or the average of the difference between successive antenna heights at which nulls occur is determined. The graph for $n=1$ is plotted in Fig. 2 and indicates the order of accuracy possible with this method.

Tests of this direction finding arrangement have been made by ground experiments utilizing a carrier frequency of 200 megacycles per second. For these tests, a small elevator arrangement for raising and lowering the receiver and antenna were constructed and a pulley and rope suspended from a pole 150 feet away was used for raising and lowering the transmitter. Measurements were made of the height of the receiving antenna corresponding to minima in the received intensity for different heights of the transmitter. Transmitter heights of 18, 27, 36, 41, 51, 60, and 61 feet were employed. The minima occurred at the points predicted by the theory, except that the lowest one occasionally split into two or three depending upon the angle of elevation of the transmitter. This was caused by the roughness of the ground between the transmitter and the receiver. After applying corrections the angles of elevation were computed and were found to agree with the actual angles within less than one degree. Over a local area of flat terrain, the method appears to be capable of giving much greater accuracy. In this connection, as it is necessary to have flat ground for a radius of only about 100 feet around the receiving antenna, this may be provided by grading. For a maximum height of the receiving antenna of 15 feet, this graded area would provide for all angles of elevation above 8.5°.

In Fig. 3, showing illustratively a suitable means for use at the receiving station, the receiver 10 and interceptor or antenna 11 preferably in the form of a horizontal tuned loop, as shown, are suspended from a rope or cable 12, passing over pulleys 13 and 14 carried by cross arm 15, on pole 16. The pole 16 is marked off to indicate the height of the receiver 10—11 above the ground, as shown, or may be directly marked with the angle θ, as derived from Fig. 2, and a pointer 17 may be mounted on the receiver to stand in proximity to the scale or measuring means on the pole 16. The end of the rope 12 may be secured in any suitable manner, as by cleat 18 mounted on the pole 16. The null indicator 20, which may be directly carried by receiver 10, may be easily read by use of a ladder or elevated platform or any other suitable means herein represented by telescope 21.

There has been described above what is now considered to be the best embodiment of our invention, but it is to be understood that our invention is not limited to the details of the embodiment disclosed, but is defined by the reasonable scope of the appended claims.

As used in the appended claims the term "null-spacing" or any like term, is intended to define the distance in altitude between adjacent so-called "null points" of field intensity produced by the interference of waves arriving from the transmitter by a direct path and by a path of reflection from a reflecting surface, and in this connection, the use herein of the term "null-point" or like terms, is of course not to be interpreted in a limited sense, as such terms are well known to include as equivalents points of determinate reception such as points of minimum or maximum reception.

We claim:

1. A method of measuring vertical angle of incidence of radio waves which consists in obtaining a direct indication of the vertical angle of incidence of the wave by measuring the null-spacing in altitude above a reflecting plane with respect to reception of the wave, thereby affording a basis for determining the vertical angle of incidence by the mathematical relation thereof to said null-spacing.

2. In measuring the vertical angle of incidence of a radio wave, the step of obtaining a direct indication of the vertical angle of incidence of the wave by measuring the altitudes above a reflecting plane at which directly received components of the wave and components thereof reflected from the reflecting plane combine with each other to produce a null.

3. In radiometeorography, the method of measuring distance of an unmanned transmitter-carrying ballon from a receiver, which comprises determining the altitude of the ballon transmitter, and obtaining a direct indication of the vertical angle of incidence of the transmitted wave by measuring the null-spacing in altitude above a reflecting plane with respect to reception of the transmitted wave, thereby affording a basis for determining from said angle and the altitude of the ballon transmitter, the horizontal distance of the balloon transmitter from the receiver.

4. A device of the class described, comprising a surface for reflecting components of an incident radio wave, a receiver for said radio wave having a wave interceptor positioned to receive components of said radio wave by a direct path from its source and by a path of reflection from said reflecting surface, said interceptor being positioned in altitude relative to said reflecting surface to be coincidental with a point at which a null is produced by the interference of said direct and reflected components, means for adjusting said interceptor to said coincident position, and means for measuring the spacial separation normal to said reflecting surface between at least two of said points of coincidence, thereby determining the angle of incidence of the wave with respect to said plane.

5. Means for determining the distance between a selected point and a radio transmitter at known altitude from the plane of said point, comprising a surface for reflecting components of an incident radio wave, a receiver for said radio wave having a wave interceptor positioned to receive components of said radio wave by a direct path from its source and by a path of reflection from said reflecting surface, said interceptor being positioned in altitude relative to said reflecting surface to be coincidental with a point at which a null is produced by the interference of said direct and reflected components, means for adjusting said interceptor to said coincident position, and means for measuring the spacial separation normal to said reflecting surface between at least two of said points of coincidence, thereby determining the angle of incidence of the wave with respect to said surface, which angle, with the known altitude of the transmitter, determines the distance thereto.

6. A device of the class described, comprising a surface for reflecting components of an incident radio wave, a receiver for said radio wave arranged to receive components of said radio wave by direct paths from its source and by paths of reflection from said reflecting surface and to receive said components at various positions in altitude relative to said reflecting surface, and means for measuring the spacial separation normal to said reflecting surface between at least two positions of altitude coinciding with minima points of reception.

HARRY DIAMOND.
FRANCIS W. DUNMORE.
WILBUR S. HINMAN, Jr.

REFERENCES CITED

The following references are of record in the file of this patent:

UNITED STATES PATENTS

| Number | Name | Date |
| --- | --- | --- |
| 2,134,535 | Runge | Oct. 25, 1938 |

OTHER REFERENCES

Radio Engineering by Terman, 1937, pp. 681-682.